June 19, 1928.
S. T. CAMPBELL
1,674,387
PROCESS AND APPARATUS FOR VULCANIZATION
Original Filed Oct. 2, 1920   7 Sheets-Sheet 1
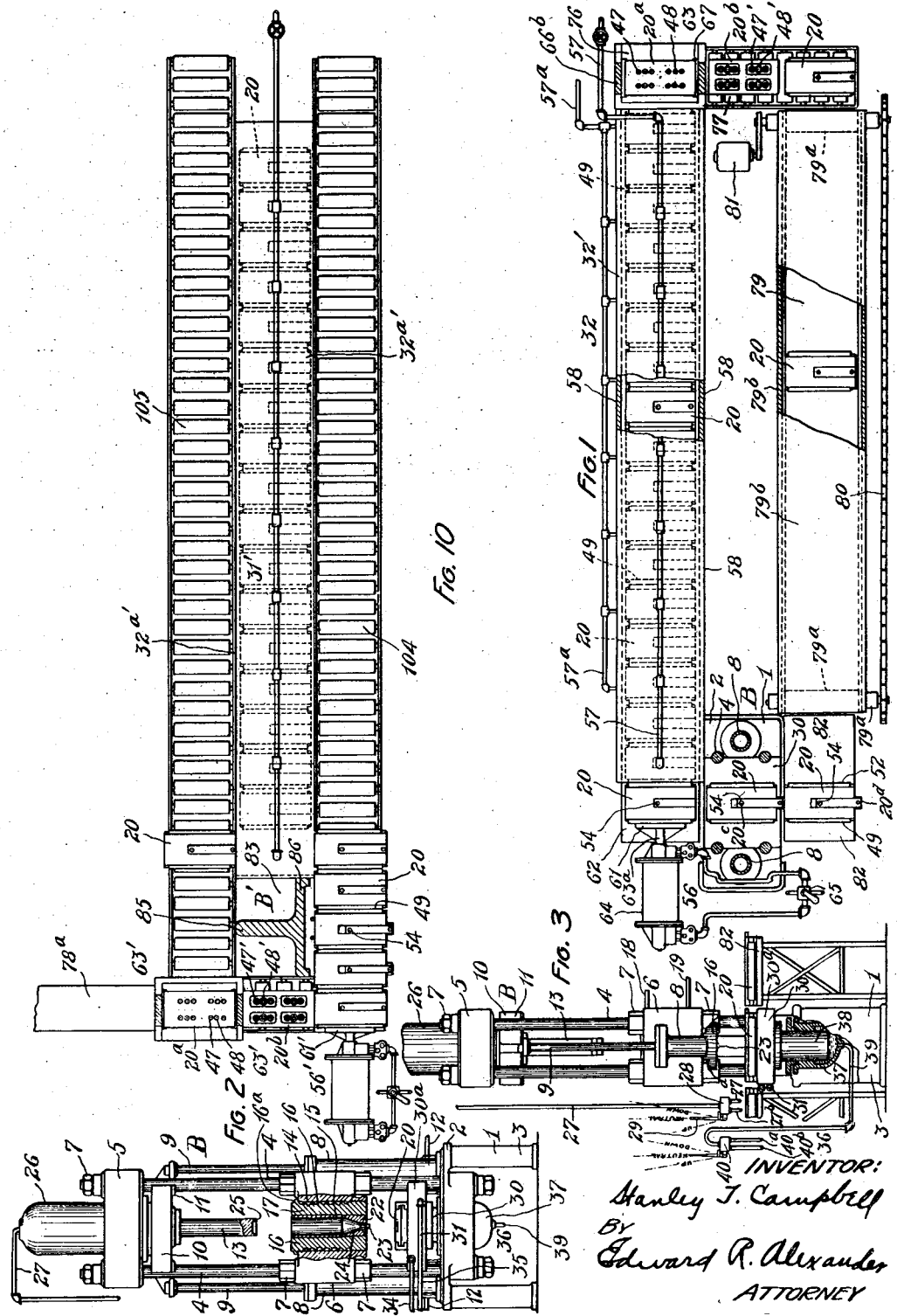

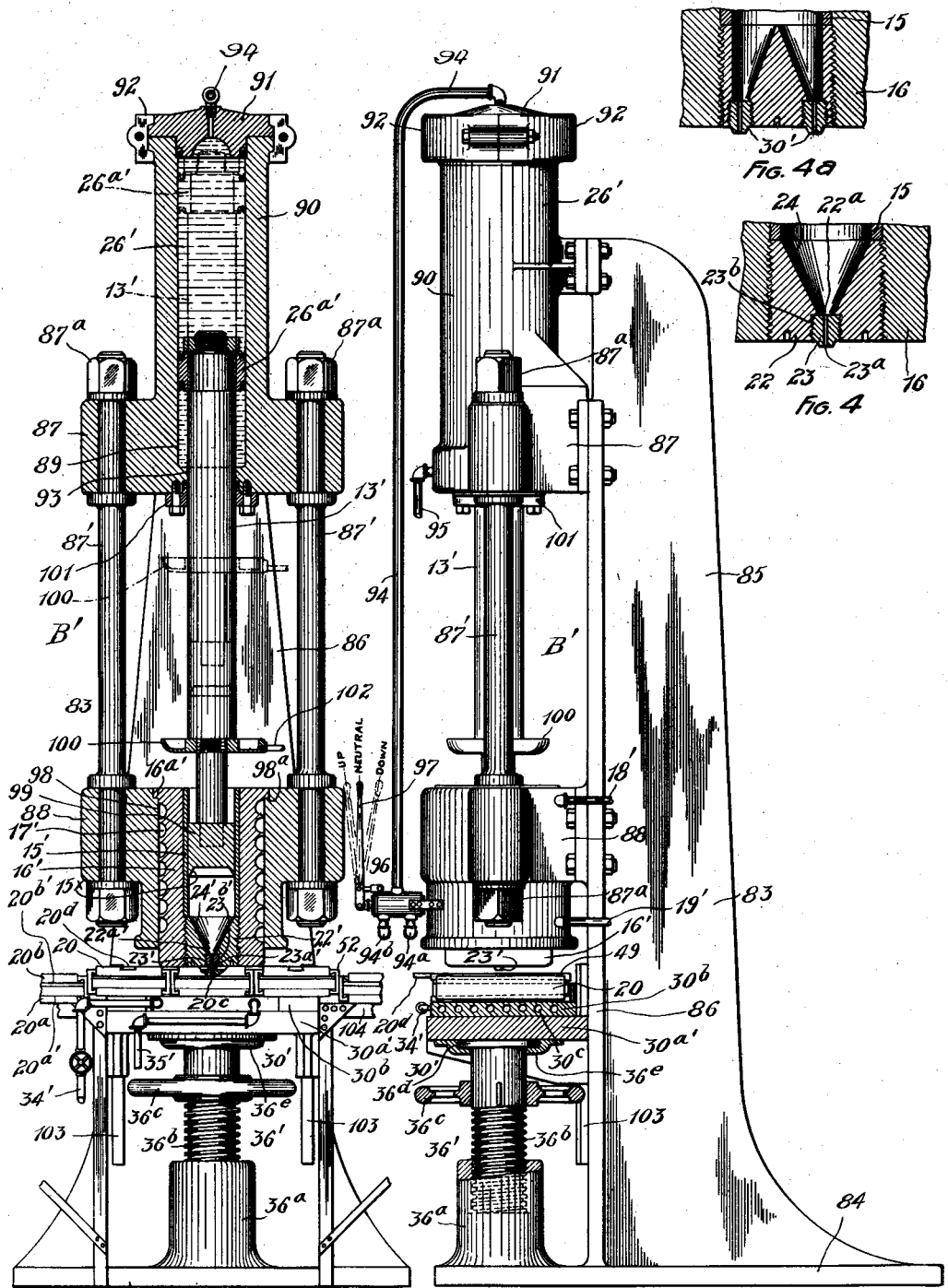

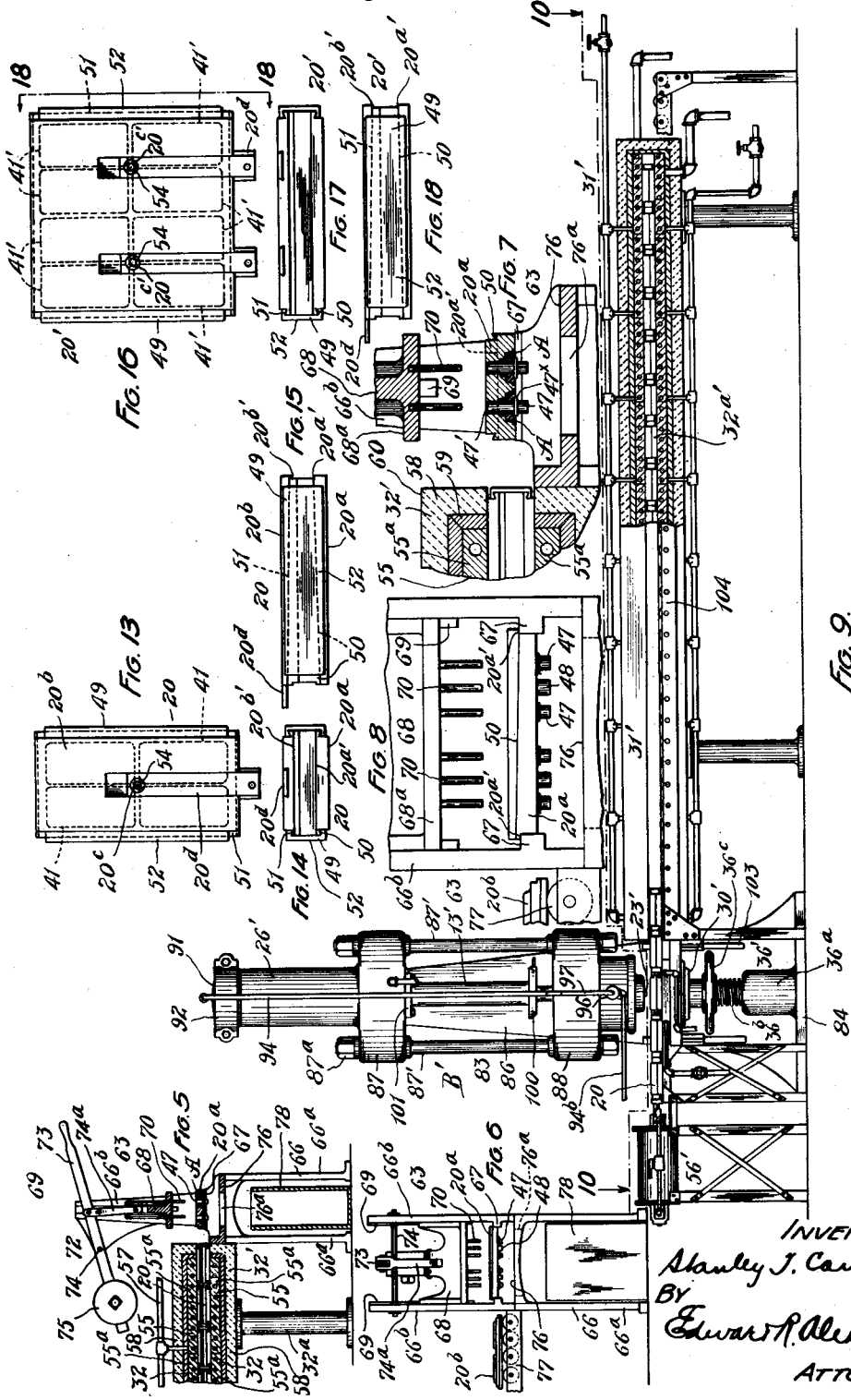

June 19, 1928. 1,674,387
S. T. CAMPBELL
PROCESS AND APPARATUS FOR VULCANIZATION
Original Filed Oct. 2, 1920   7 Sheets-Sheet 4
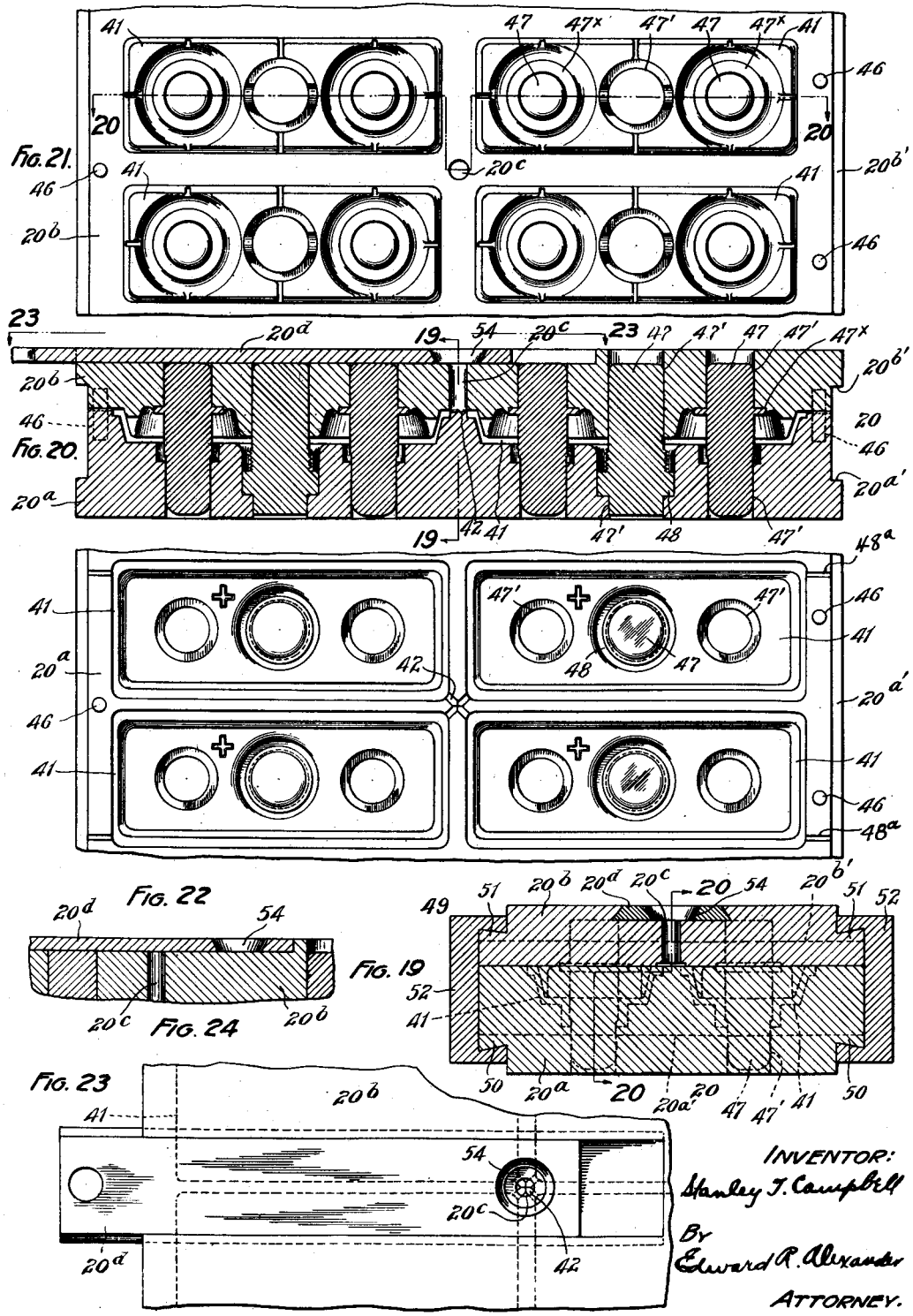

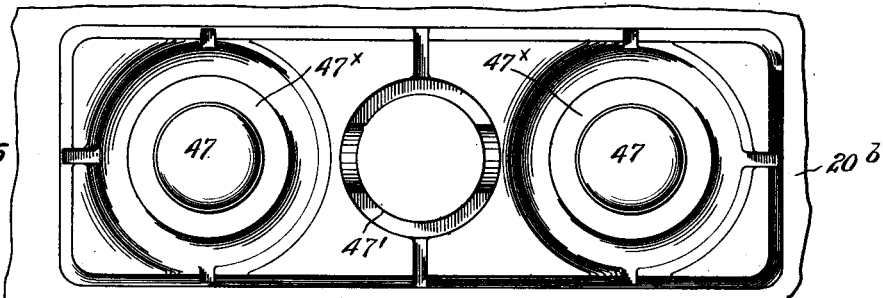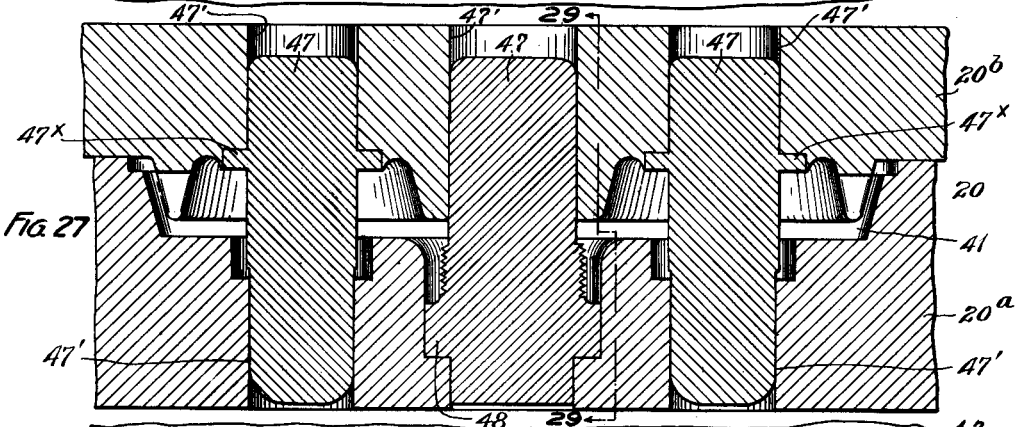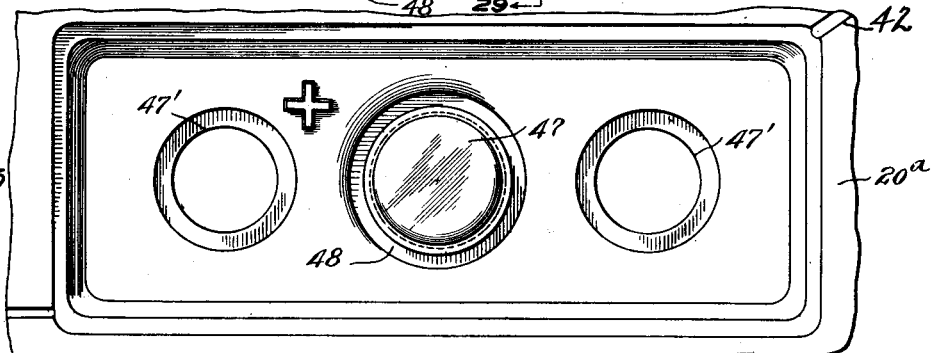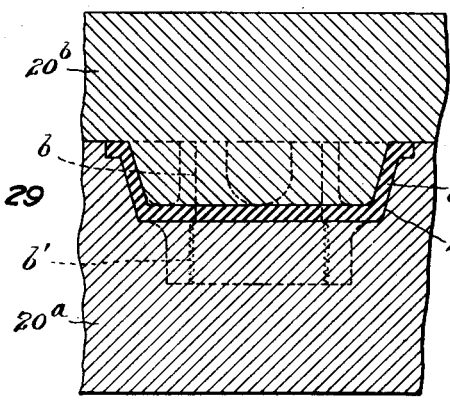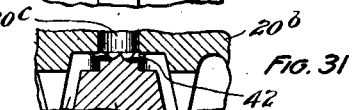

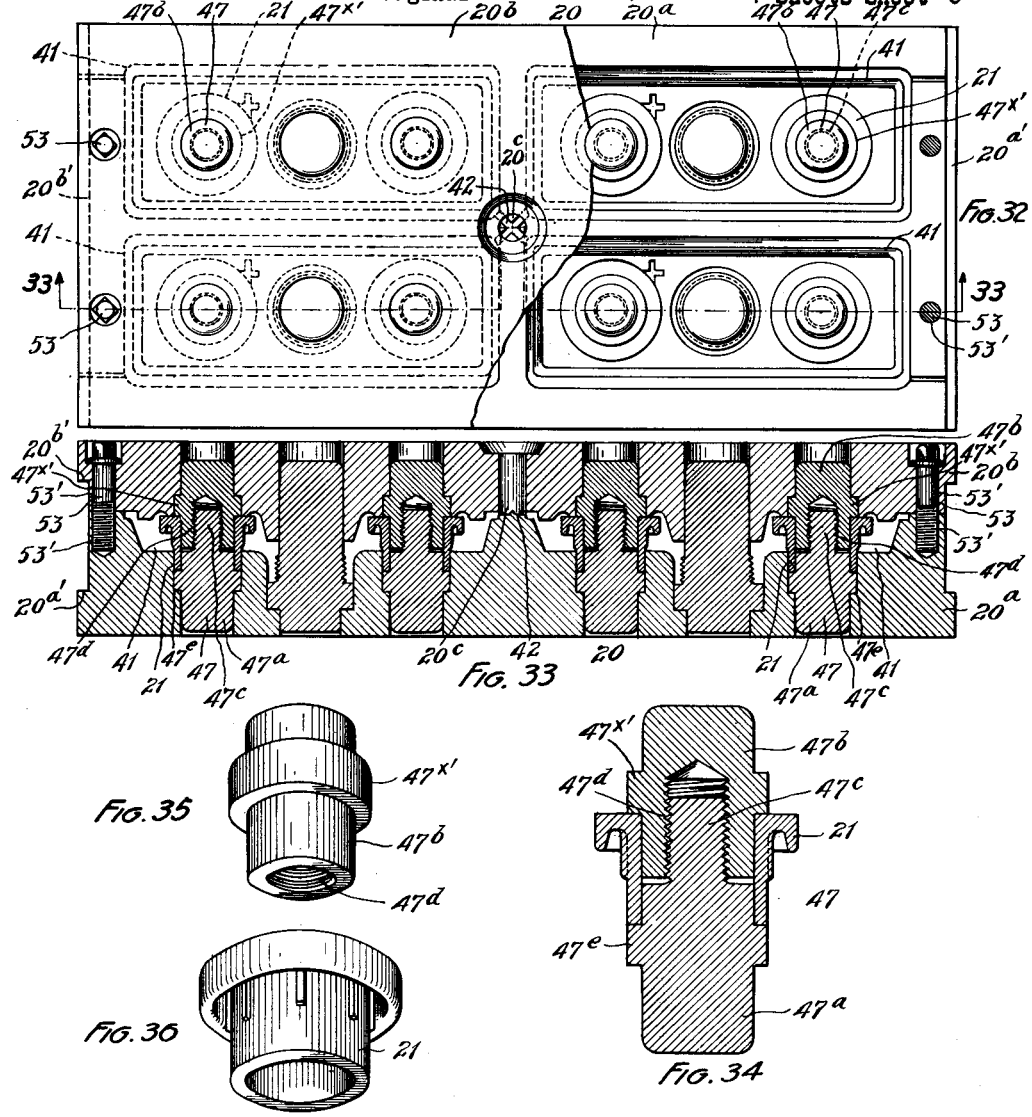

June 19, 1928.
S. T. CAMPBELL
1,674,387
PROCESS AND APPARATUS FOR VULCANIZATION
Original Filed Oct. 2, 1920    7 Sheets-Sheet 7
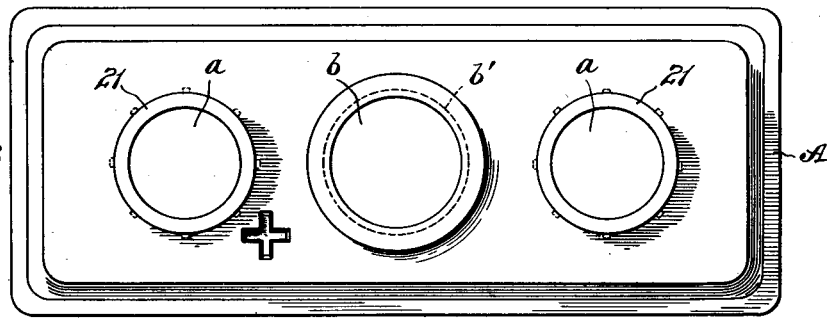
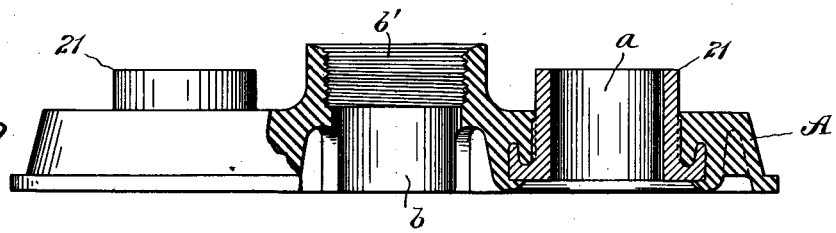
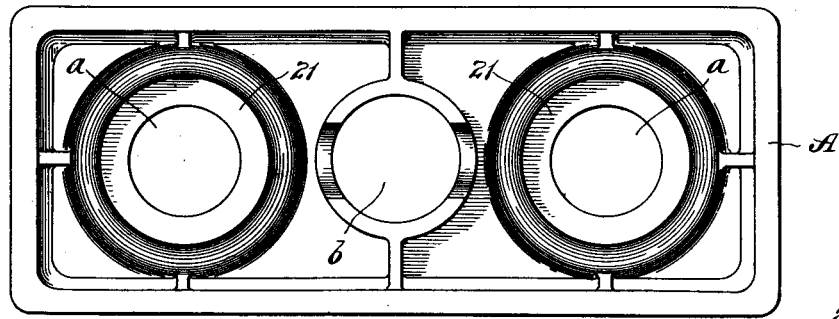
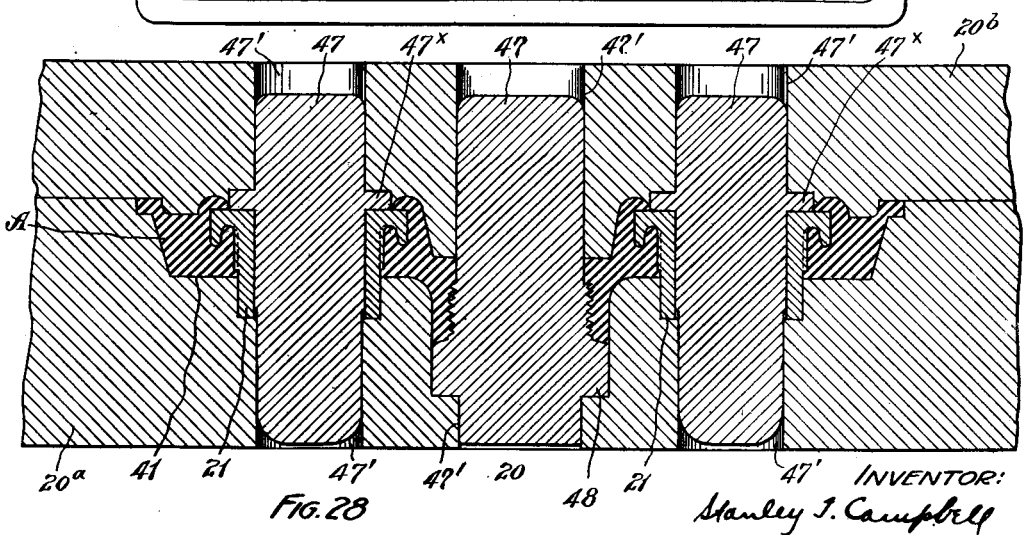
INVENTOR:
Stanley T. Campbell
BY
Edward R. Alexander
ATTORNEY Patented June 19, 1928.

1,674,387

UNITED STATES PATENT OFFICE.

STANLEY T. CAMPBELL, OF CLEVELAND, OHIO.

PROCESS AND APPARATUS FOR VULCANIZATION.

Application filed October 2, 1920, Serial No. 414,259. Renewed November 17, 1927.

This invention relates to an improved process of and apparatus for shaping and forming articles or bodies from plastic or semi-plastic material, such as rubber or rubber compound.

One object of the invention is to provide an improved process of producing soft and hard rubber articles, whereby a minimum amount of labor, both skilled and unskilled, is required, the equipment and number and character of operations are reduced and simplified and the output or capacity materially increased.

Another object of the invention is to provide an improved process in which crude rubber, rubber compound or like material, either in a treated or untreated condition, can be readily, quickly and properly shaped into bodies or articles of any desired construction.

Another object of the invention is to provide an improved process of an apparatus for shaping rubber or rubber compound, whereby bodies having walls of a predetermined shape, uniform texture, and relatively high density and tenacity can be readily and economically produced.

Another object of the invention is to provide an improved process of forming soft and hard rubber articles or bodies of any predetermined shape by squirting treated or untreated rubber directly into cavities and heating the walls of the latter to cause vulcanization.

Another object of the invention is to provide an improved process of shaping rubber compound into bodies of any desired contour and construction and vulcanizing the bodies without the use of pressure during the vulcanization.

Another object of the invention is to provide improved apparatus for readily, quickly and economically shaping articles or bodies out of plastic material, such as crude rubber or rubber compound, either in a treated or untreated condition.

Other objects of the invention will be apparent to those skilled in the art to which my invention relates from the following description, taken in connection with the accompanying drawings.

For the purpose of illustration, I have, in the accompanying drawings shown and herein described one form of apparatus embodying my invention and suitable for carrying out my novel process in actual practice.

Referring to the drawings, Fig. 1 is a plan view, partly broken away, illustrating an apparatus embodying my invention and adapted for carrying out my improved process of squirting into the cavity or cavities of a vulcanizing member treated or untreated crude rubber or rubber compound and vulcanizing the same to form articles or bodies of any predetermined shape and construction.

Fig. 2 is a fragmentary view, the squirting apparatus being shown in front elevation with a vulcanizing member in position ready to be connected with the nozzle of the squirting mechanism.

Fig. 3 is a side elevation of the parts shown in Fig. 2, partly broken away.

Fig. 4 is a detail sectional view of the nozzle for the squirting mechanism.

Fig. 4ª is a view similar to Fig. 4 but showing a modified form of nozzle construction embodying the invention.

Figs. 5 and 6 are fragmentary views showing in section and side elevation, respectively, the mechanism for ejecting the vulcanized articles or bodies from the vulcanizing members.

Figs. 7 and 8 are fragmentary detail views, enlarged, of the parts shown in Figs. 5 and 6, respectively.

Fig. 9 is an elevational view, partly broken away, illustrating an apparatus embodying a modified form of my invention.

Fig. 10 is a section on the line 10—10 of Fig. 9.

Figs. 11 and 12 are respectively side and front elevations, partly in section, of the apparatus shown in Fig. 9, the latter showing the vulcanizing member elevated and connected with the squirting nozzle.

Fig. 13 is a top plan view of one form of vulcanizing member with the upper and lower elements thereof clamped together ready for positioning in the squirting apparatus.

Fig. 14 is an end view of the vulcanizing member shown in Fig. 13.

Fig. 15 is a side view of the vulcanizing member shown in Fig. 13.

Figs. 16, 17 and 18 are views corresponding to Figs. 13, 14 and 15, respectively, but showing a slightly modified form of vulcanizing member in which a plurality of material inlets are provided.

Fig. 19 is a transverse sectional view, enlarged, of the vulcanizing member shown in Figs. 13, 14 and 15; such view also being a section on the line 19—19 of Fig. 20.

Fig. 20 is a longitudinal sectional view of the vulcanizing member shown in Figs. 13, 14 and 15; such view also being a section on the line 20—20 of Figs. 19 and 21.

Fig. 21 is a lower plan fragmentary view of the upper element of the vulcanizing member.

Fig. 22 is a top plan fragmentary view of the lower element of the vulcanizing member.

Fig. 23 is a fragmentary view looking downwardly on the line 23—23 of Fig. 20.

Fig. 24 is a fragmentary sectional view of the vulcanizing member showing the valve therefor closed.

Figs. 25 and 26 are fragmentary views corresponding to Figs. 21 and 22, respectively, but enlarged.

Fig. 27 is an enlarged fragmentary sectional view similar to Fig. 20.

Fig. 28 is a view similar to Fig. 27, but showing the cavity in the vulcanizing member filled.

Fig. 29 is a fragmentary sectional view of the vulcanizing member filled, on the line 29—29 of Figs. 27 and 28.

Figs. 30 and 31 are fragmentary views, the latter being a section on the line 31—31 of Fig. 30.

Fig. 32 is a plan view, partly in section, of another form of vulcanizing member.

Fig. 33 is a section on the line 33—33 of Fig. 32.

Fig. 34 is a sectional view, enlarged, of one of the core devices shown in Figs. 32 and 33.

Figs. 35, 36 and 37 are perspective detail views.

Fig. 38 is a top plan view of an article or body, after it has been vulcanized and removed from the vulcanizing member, such article or body being shown as a battery jar cover for illustrative purposes.

Fig. 39 is a bottom plan view of the article or body shown in Fig. 38.

Fig. 40 is a view partly in elevation and partly in section of the article or body shown in Figs. 38 and 39.

In shaping and forming vulcanized articles according to my improved process, I use rubber or like material, preferably crude rubber or rubber compound which has been mixed with suitable ingredients and the desired amount of sulphur to effect vulcanization upon the application of heat and the production of soft or hard rubber articles, as desired; or I may use either of these materials after the same has been treated in any desired or usual manner, for example, by one or more mills or calendering apparatus. In the following description and appended claims, it will be understood that in the use of the terms rubber, crude rubber, rubber compound or material I have reference to any one or all of these materials. In practice, I have found the following compound suitable for making hard rubber articles by means of my improved process and apparatus: crude rubber 26%; mineral rubber 13%; asbestos pulp 28%; coloring matter (carbon black for example) 1%; lime 5%; dust 13%; sulphur 13%; and a vulcanizing accelerator 1%. For making soft rubber articles by means of my process and apparatus, the following compound may be used: crude rubber 10.5%; zinc oxide 42.5%; sulphur 4%; white substitute 6.5%; asbestos pulp 5.5%; cotton seed oil 3%; ground scrap 25%; and lime 3%.

In carrying out my improved process, I first assemble together face to face the separable elements constituting the member 20 in which vulcanization or curing of the material takes place. The separable elements, preferably two in number, indicated at 20$^a$, 20$^b$, are formed with recesses correlated and arranged to provide a cavity or a plurality of cavities between them, when arranged face to face, to shape and form an article of the desired predetermined construction. One of the elements—the upper one—is formed with an inlet opening 20$^c$ for the material, which opening leads directly or by means of gates to the cavity or cavities, whereby the material may be squirted into the latter.

Where the body to be shaped and vulcanized is formed with openings and one or more thereof is or are provided with bushings 21 such as is required in the battery cover shown in the drawings, (see Figs. 38, 39, 40), I form the elements 20$^a$, 20$^b$, with aligned openings to receive and support the required cores and also shape the cavity walls around the cores to receive the bushings, which are to be embedded in the walls of the body or article.

I then rigidly secure or lock the elements 20$^a$, 20$^b$, together.

Next, I connect the material inlet opening of the vulcanizing member 20 to the nozzle of a squirting mechanism and squirt the material, such as crude rubber, rubber compound or treated rubber, under a relatively high pressure from the nozzle through the material inlet opening into the cavity or cavities of the vulcanizing member, completely filling the same. I prefer, while carrying out this step of my process, to heat the material containing cylinder of the squirting mechanism and also the vulcanizing member 20, the effect of which is to soften or maintain soft the material while it is being squirted and to insure its flow or movement to all parts of the cavity or cavities. For the purpose of carrying out this step of my process I place the material in a cylinder from which extends a nozzle having a relatively small discharge opening. Due to the tenacious and elastic characteristics of the material and its resistance to being forced through a small discharge opening, it will be understood that in squirting the material therethrough the material undergoes a thorough kneading and mixing operation, whereby it is substantially uniformly conditioned as it is forced through the nozzle into the cavity or cavities of the vulcanizing member.

The application of heat to the vulcanizing member during the squirting operation, in addition to facilitating the flow of the material into all parts of the cavities, tends to economize on the expense of and time required for vulcanizing the material.

I then disconnect the vulcanizing member 20 from the nozzle.

When it is preferred, I may close the material inlet opening, by a valve, indicated at 20$^d$, to seal the vulcanizing cavity, thus preventing any of the material from flowing out of the cavity prior to or during vulcanization.

Next, I apply heat to the vulcanizing member 20, the purpose of which is to effect vulcanization. The degree of temperature and length of application of the heat will vary according to the conditions present, but in making battery covers A, such as herein disclosed, I prefer to use a temperature of 325 degrees F. and to apply this heat for fifty minutes, approximately. The vulcanizing member may be heated to the required temperature for the full period of time required by the same heating means used to heat the member 20 prior to and during the squirting operation, but in the preferred manner of carrying out my process, I provide a separate heating means 32, to which the vulcanizing member 20 is transferred to permit other members 20 to be successively charged with material and placed in the separate heating means for vulcanization purposes.

Finally, when vulcanization has been completed, I remove the shaped articles or bodies from the cavities of the vulcanizing members. In carrying out this step the elements 20$^a$, 20$^b$, are separated and the vulcanized body or bodies then removed.

In carrying out my process, I squirt the material under relatively high pressure and in a substantially uniformly conditioned state. Accordingly, it is forced into every portion of the cavity and compressed therein into a relatively dense and uniformly conditioned mass or body against and between the cavity walls of the vulcanizing member 20, and upon the application of heat, the walls of the body become relatively dense and non-porous and their outer surfaces will become smooth, devoid of pits or recesses and correspond exactly to the shape of the cavity.

Referring to the accompanying drawings (particularly Figs. 1, 2, 3, 4, 5, 6, 7 and 8), wherein is shown suitable apparatus for carrying out the steps of my process, B indicates as an entirety a mechanism or apparatus for squirting the material into the vulcanizing members 20. Of the squirting mechanism B, 1 indicates a frame preferably comprising a base 2, having depending supports 3, a plurality of standards 4 and upper and lower cross members 5 and 6, respectively. The standards 4 extend through alined openings formed in the base 2, and cross members 5 and 6, which are rigidly secured to the standards 4 by nuts 7. The standards 4 and members 5 and 6 serve to provide a rigid framework capable of withstanding the strains required in apparatus of this character. 8 indicates a pair of tubular members which may be formed integral with the base 2. The tubular members 8 operate as hydraulic cylinders for a pair of piston rods 9, which, together with a cross plate 10, constitute a push-back ram. The opposite ends of the cross plate 10 are provided with suitable shoes 11, which slidably engage with and are guided by the standards 4. 12 indicates pipes leading from the lower ends of the cylinders 8 and connected with a suitable water supply under pressure (not shown), which tends to elevate the ram in the manner hereinafter set forth. I prefer to maintain at all times the pressure on the pistons (not shown), connected to the rods 9.

The cross plate 10 has secured to it, in any desired manner, a plunger 13 carrying at its upper end a piston (not shown), the purpose of which elements will later be set forth.

14 indicates an opening formed in the supporting element 6 and arranged to receive a cylinder 15. The cylinder 15 is preferably of a size, relative to the opening 14, to permit the provision of an annular member 16 between it and the wall of the opening 14. The annular member may be heated to any desired degree of temperature so as to maintain the material in the cylinder 15 in a substantially plastic condition, or in a suitable condition to facilitate its squirting, kneading and mixing, and shaping. For this purpose, the outer wall of the annular member 16 may be formed with a spiral groove 17, which co-operates with the inner wall of the opening 14 to form a steam conduit. The opposite ends of the conduit are connected with openings formed in the walls of the supporting element 6, and these openings in turn are connected with steam supply and discharge pipes 18, 19, respectively. The upper end of the annular member 16 is preferably provided with a flange 16$^a$ which engages the upper face of the supporting element 6, whereby the annular member 16 is supported in the opening 14. 22 indicates a plug or head element for closing the lower end of the cylinder 15 and formed with an opening 22ª which registers or communicates with the opening 23ª in a nozzle 23. The wall of the head element above and surrounding the opening 22ª is preferably of conical shape, as shown at 24, and so arranged that its upper end terminates at a point coinciding with the lower end of the inner surface of the cylinder 15. One purpose of this construction is to avoid the formation of a shoulder or flat surface at the lower end of the cylinder 15, whereby all the material placed in the cylinder will be squirted through the opening 22ª. To provide for the arrangement just described, I prefer to terminate the cylinder 15 above the lower end of the heating member 16 and to fit the head element 22 in the latter, but tight against the adjacent end of the cylinder 15 (see Fig. 4). The head element 22 is preferably secured in position by means of screw threads provided on it and the adjacent inner walls of the heating member 16. These means permit the head element 22 to be readily removed, when necessary. The walls of the opening 22ª are suitably formed to receive the inner end of the nozzle 23, the latter being preferably secured therein by means of screw threads 23ᵇ. The outer end of the nozzle 23 is preferably beveled so that it may be properly fitted to and correlated with the material inlet opening 20ᶜ for the cavity or cavities in the vulcanizing member 20. The cylinder 15 is arranged to receive a charge of material and as the plunger 13 descends into the cylinder 15, it will squirt the material through the nozzle into the vulcanizing member 20. The plunger 13 snugly fits the inner wall of the cylinder 15. Its head end is preferably cut away at its central portion so as provide an annular scraping edge 25, which serves to scrape the material from the cylinder wall, as the plunger operates downwardly, and to prevent the material from leaking past it.

Due to the plastic and tough nature of the rubber or rubber compound used for squirting, and the forcing thereof through a relatively small opening, it will be seen that the rubber or rubber compound as it is squirted through the nozzle will undergo a combined kneading and mixing operation. It will also be seen that the resistance of the material to being forced or squirted through the nozzle opening will cause considerable friction which in turn will create heat. The heat will tend to soften or melt the rubber, whereby it will flow through the nozzle in a stream-like condition.

26 indicates the cylinder for the piston which operates the plunger 13 downwardly. The cylinder wall may be formed integral with the upper cross member 5. The piston for the cylinder 26 is preferably adapted to be operated downwardly by water under pressure. For this purpose, the upper end of the cylinder 26 is formed with an opening, to the walls of which is connected a water pipe 27 leading to the source of supply. The piston for the cylinder 26 has a surface area greater than the combined areas of the pistons fixed to the rods 9, so that when the pressure is applied to the cylinder 26, it will force the piston therein and plunger 13 downwardly, overcoming the pressure on the pistons of the push-back ram. As the cylinders 15 and 26 are in axial alignment, a relative high pressure can be exerted upon the plunger 13 in a simple manner and without the utilization of unduly heavy supporting elements and framework.

28 indicates a valve mechanism of suitable construction adapted to control the flow of water to and from the upper end of the cylinder 26 or to cut off the flow thereto. The valve may be operated by a handle 29. In the preferred form of construction the pipe 27 is connected through the valve mechanism 28, either with the source of supply through a pipe 27ª, or with a discharge pipe 27ᵇ. The valve mechanism 28 preferably comprises a valve member movable into three different positions, as indicated by the handle 29 in Fig. 3, whereby the water pressure to the upper side of the piston may be controlled in a well-known way.

The plunger 13 is elevated to the position shown in Figs. 2 and 3, by throwing the handle 29 to the "up" position (thus connecting the pipe 27 with the discharge pipe 27ᵇ) and allowing the water pressure to act on the pistons fixed to the rods 9. When thus elevated (see Fig. 2), the cylinder 15 may be filled with the desired charge of material.

30 indicates a bed on which the vulcanizing member 20 is positioned for the squirting operation. The bed 30 is movable up and down a sufficient distance to permit proper engagement of the walls of the material inlet opening 20ᶜ with the nozzle 23. The bed 30 preferably comprises a relatively heavy base plate 30ª, which may be guided in its up and down movements by engagement with the standards 4. 31 indicates a means for heating the vulcanizing member. These heating means are associated with the bed 30 and are primarily intended to heat the member 20 sufficiently to soften or keep soft the material which is being squirted into the cavities thereof. The heating means 31 may however be utilized to cause vulcanization of the rubber or rubber compound squirted into the cavity or cavities of the vulcanizing member 20, without the necessity of removing it from the bed 30. By preference I provide a separate heating means, indicated as an entirety at 32, thus permitting the squirting of a series of molds successively and the vulcanization thereof to be carried on simultaneously in stepped order. In thus carrying out my process, I utilize the heating means 31 for heating the vulcanizing member while at the squirting position and hence economize on time and the heating medium when the vulcanizing member is placed in the heating means 32.

The heating means 31 preferably comprises a plurality of connected steam conduits (not shown) formed in the bed 30 and extending from end to end thereof in substantially parallel relationship. The steam is conducted to one end of the conduits and discharged from the opposite end thereof by pipes 34, 35, respectively.

36 indicates as an entirety devices for raising and lowering the bed 30 to cause engagement of the vulcanizing member 20 with the nozzle 23 and disengagement therefrom. These devices preferably comprise a cylinder 37 mounted in the frame 1 and carried by the base 2 thereof, and a piston 38 mounted to operate in said cylinder 37. The walls of the cylinder 37 are preferably formed integral with the base 2. The lower end of the cylinder is formed with an opening to which is connected a pipe 39 for supplying water under pressure to the lower side of the piston 38 for raising it. The pipe 39 leads to a valve mechanism 40 to which are connected the water pressure supply pipe $40^a$ and discharge pipe $40^b$. The valve mechanism 40 being similar in construction to the valve mechanism 28, its description will not be necessary; but through its lever, the operation of the piston 38 (which is connected in any well-known manner to the bed 30) is controlled to engage the vulcanizing member 20 with and its disengagement from the nozzle 23.

The vulcanizing member 20 shown for illustrative purposes comprises two separable elements $20^a$, $20^b$, formed from suitable material, such as cast iron or aluminum alloy, to withstand the pressure incident to the squirting operation and the heat required for vulcanization as well as to permit their use over and over again. The opposing walls of the elements $20^a$, $20^b$, are shaped to form one or more cavities 41. In one form of construction shown (Figs. 13, 14, 15, 20, 21, 32, and 33), the vulcanizing member 20 is formed with four cavities, each adapted to shape the squirted rubber or rubber compound into a battery jar cover A (see Figs. 38, 39 and 40). I prefer to provide the vulcanizing member 20 with four cavities 41, all connected by suitable gates 42 (Figs. 30 and 31) with the material inlet opening $20^c$. If desired, a larger number of cavities may be formed, as shown at 41', in the vulcanizing member 20' (see Figs. 16, 17 and 18). In this latter form of construction I prefer to provide the vulcanizing member 20' with two material inlet openings $20^{c'}$ into and through which the rubber or rubber compound may be simultaneously squirted by a duplex type of nozzle 23' shown in Fig. $4^a$.

47 indicates devices correlated with the elements $20^a$, $20^b$, and arranged to be actuated by the ejecting elements of a separating mechanism, to be later described, indicated as an entirety at 63.

The devices 47 preferably comprise pins slidably mounted to move endwise in openings 47' formed in the elements $20^a$, $20^b$, so that they can be engaged by ejecting elements (to be later referred to) first to separate the two elements $20^a$, $20^b$, and second to remove the vulcanized body from one of the elements $20^a$, $20^b$, after separation thereof. For this purpose, certain of the devices 47 are provided with shoulders $47^x$ which in the preferred form of construction, engage the upper surfaces of the vulcanized bodies A so that when the ejecting elements engage the upper ends of the devices 47, the shoulders $47^x$ will serve to separate the element $20^a$ from the element $20^b$; and certain of the devices 47 are provided with shoulders 48 which engage the under surfaces (or rather the edge of the collars $b'$) of the vulcanized bodies A, so that when the ejecting elements engage therewith, the shoulders 48 (see Figs. 20 and 28) will separate the bodies from the adjacent vulcanizing member element $20^a$.

In forming the battery jar cover A, which has been chosen as illustrative of an article to be made by my novel process and apparatus, I utilize the separating devices 47 as core pins to form the openings $a$ and $b$ required in the present type of battery. That pin 47 which forms the filling opening for the battery is provided with screw threads, whereby screw threads (for a well-known purpose) are formed on the inner wall of the collar $b'$ surrounding the opening $b$. 21 indicates the metallic inserts or bushings which are positioned around the cores 47 so as to be embedded in the rubber when it is shaped and vulcanized.

The elements $20^a$, $20^b$, of the vulcanizing member 20 are preferably provided with aligning devices 46, comprising dowel pins and openings therefor (see Figs. 20, 21 and 22), which insure correlation of the cavity walls and alignment of the openings 47' for the core pins 47.

Any suitable means, indicated as an entirety at 49, may be used for locking the elements $20^a$, $20^b$, together, whereby the material can be squirted into its cavities under relatively great pressure to (1) completely fill the same and (2) compact the material into a dense, homogeneous mass, which, upon the application of heat, results in a vulcanized rubber body having walls of relatively great density, tenacity and tensile strength.

The locking means shown in Figs. 1, 2 and 11 to 19, inclusive, comprise a pair of cooperating ribs 50, 51, at each longitudinal side of the member 20 and carried by the elements 20ª, 20ᵇ, respectively, and a clamping element 52. The opposite outer side walls of each pair of ribs are dove-tailed and inclined relative to each other to receive the clamping element 52 which is provided with converging flanges shaped to slidably engage the dove-tailed ribs and thus secure the two elements together as shown. The locking means shown in the construction of vulcanizing member shown in Figs. 32 and 33 comprise a plurality of bolts 53 extending into aligned openings 53′, the threads on the bolts engaging threads in the openings which receive the free ends of the bolts. As shown in these figures, the heads of the bolts 53 are countersunk to avoid projections on the surface of the vulcanizing member 20.

When it is desired to seal the vulcanizing member after the cavities thereof have been filled, I may provide a valve 20ᵈ for the inlet opening 20ᶜ, as shown in the construction of vulcanizing member 20 in Figs. 1, 2, and 3, 13 to 20, inclusive, and Figs. 22 and 23. The valve 20ᵈ preferably comprises a plate having beveled side walls slidably fitting similarly shaped co-acting walls of a groove formed in the upper surface of the element 20ᵇ. The valve 20ᵈ, by preference, is formed with an opening 54 which is adapted to register with the inlet opening 20ᶜ when the valve is slid laterally to the position shown in Figs. 1, 13, 19, and 23. The walls of the opening 54 are preferably of conical shape whereby it may be accurately engaged by the conical free end of the nozzle 23. As soon as the squirting operation is completed, the bed 30 is lowered to disengage the nozzle 23 from the opening 54 and the valve closed, as shown in Fig. 24. The valve 20ᵈ, when closed, serves to completely close or seal the vulcanizing member 20, to prevent any of the material from oozing out by reason of its elasticity or expansion due to heat or other means, whereby during vulcanization or curing, the material is maintained under compression until completely vulcanized.

48ª indicates an indication means by which the operative may determine when the cavity or cavities is or are completely filled. The indication means comprises relative shallow grooves formed in the abutting face of one of the elements 20ª, 20ᵇ, and extending from the cavity to the outer edge of the element. The grooves 48ª are of a size to permit the material to ooze through them after the cavities are filled due to the pressure used in squirting the material. As a result of this construction, when the operative sees the material flowing from the outer ends of the grooves 48ª, he knows the cavities are full and he thereupon operates the handle 29 to cut off the pressure to the cylinder 26.

The means 32 for heating the vulcanizing member 20 to completely vulcanize or cure the material in the cavity or cavities therein, after they have been filled with material, may be of any suitable construction. The heating means shown herein consists of an elongated chamber 32′ in which are provided a pair of heating members 55, 55, spaced apart a distance equal to the thickness or height of the vulcanizing member 20, whereby the latter may be positioned therebetween and in direct contact therewith to insure heating and proper and complete vulcanization or curing of the rubber or rubber compound squirted into the cavity or cavities in the vulcanizing member. The heating chamber 32′ may be supported by a plurality of standards or legs, one of which is shown at 32ª (Fig. 5). The heating chamber 32′ is open at its opposite ends to permit the ready introduction of filled members 20 into it and their discharge therefrom. The heating chamber 32′ may be arranged at the rear side of the squirting mechanism B with its receiving end adjacent the bed 30. This arrangement permits the charged vulcanizing members to be easily moved rearwardly from the charging position to a position for quick insertion in the heating chamber 32′. The vulcanizing members 20 are preferably moved endwise of the chamber 32′, while being vulcanized, and discharged from its open end at the end of the vulcanizing operation. For this purpose I provide suitable moving or feeding mechanism, which is indicated as an entirety in the drawings (Fig. 1) at 56. Each of the heating members 55 is preferably formed in sections 55ª to facilitate their manufacture and assembly and to permit the entire member to be uniformly heated and maintained at the desired degree of temperature. 57, 57ª, indicate the steam and discharge pipes, respectively, for each heating member 55. As shown, each pipe 57 is connected by a branch to each of the sections 55ª, so that each thereof will be directly connected to the supply pipe 57. 58 indicates a casing constructed and arranged to prevent radiation of heat from the plates 55ª and to adequately protect them from external conditions. The casing 58 encloses the heating members 55, 55, as shown in Fig. 1. The casing 58 preferably comprises an inner lining 59 and a cover 60, formed from suitable heat non-conducting material.

The moving or feeding mechanism for the vulcanizing members shown herein, consists of a reciprocating plunger or pusher 61 which is adapted to engage each vulcanizing member as it is delivered from the squirting mechanism B onto a table 62, arranged at the front of the heating chamber 32'. The pusher 61 serves to push each vulcanizing member 20 into the heating chamber and through the engagement of each member with the member previously pushed therein to move them step by step through the chamber and out at its discharge end to the separating mechanism 63. The pusher 61 is connected to a rod 63ª, which carries a piston (not shown) arranged within a cylinder 64 to the opposite ends of which air, steam or water under pressure is alternately admitted in a well-known manner by means of a suitable valve mechanism indicated at 65.

Of the mechanism 63 for opening or separating the vulcanizing members 20 and removing the vulcanized bodies therefrom, 66 indicates a framework comprising side members 66ª and uprights 66ᵇ extending upwardly at opposite ends of the framework proper. 67 indicates horizontal guides extending inwardly from the uprights 66ᵇ and arranged to be engaged by laterally extending shoulders or flanges 20ᵃ′, 20ᵇ′, on the elements 20ᵃ, 20ᵇ, respectively, of the vulcanizing member 20. For this purpose, the tops of the guides 67 are disposed in a horizontal plane coincident with the flanges 20ᵇ′ as the vulcanizing member 20 moves through the heating chamber 32'. Accordingly, when the members 20 are moved out of the heating chamber 32' by the pusher 61, they move onto the guides 67. 68 indicates a slide-member extending between the uprights 66ᵇ and movable up and down on suitable guides 69 carried thereby. At its lower end, the slide-member 68 is provided with a horizontal bar 68ª, from which depend a plurality of ejecting members 70, spaced relatively to each other to align and engage with the core pins 47, when the slide-member 68 is moved downwardly. 72 indicates devices for moving the slide-member downwardly. The devices 72 preferably comprise a lever 73 pivoted on a cross rod 74 and connected by a link 74ª to the slide-member 68. The free end of the lever may serve as a handle for operating it. The lever 73 is preferably counterbalanced by a weight 75, which will serve to return the slide-member 68 to its upper position, as shown in Figs. 5 and 6, after being moved downwardly. The mechanism 63 for separating the two elements 20ᵃ, 20ᵇ, of the vulcanizing member 20 and removing the vulcanized battery jar cover A therefrom operates as follows: Upon the movement of a member 20 forwardly so that the flanges 20ᵇ′ engage with the guides 67, and the removal of the devices which clamp the elements 20ᵃ, 20ᵇ, together, the operative moves the member 20 thereon to a position in which the ejecting members 70 will engage the core pins 47. The operative then pulls the lever 73 downwardly. This operation causes the ejecting members 70 to engage the core pins 47, which in turn, through the engagement of their shoulders 47ˣ, with the cover A and element 20ᵃ, move the latter downwardly onto a table 76, supported between the frame side members 66ª, thus separating such element and the cover A from the element 20ᵇ. The operative then releases the lever 73 and removes the element 20ᵇ from the guides 67, placing it on a transversely extending support 77 (see Fig. 1) and moving the element 20ᵇ to the remote end thereof. The operative next inverts the element 20ᵃ and positions it at the ejecting position on the guides 67 (see Figs. 5, 6, 7 and 8), following which he pulls the lever 73 downwardly. This latter operation, through the engagement of certain or all of the ejecting members 70 with the core pins 47 serves to move the vulcanized body A downwardly and out of engagement with the member 20ᵃ. The table 76 is preferably formed with an opening 76ª through which the bodies A drop into a receptacle 78 (Figs. 5 and 6) or onto a conveyor 78ª (Fig. 10).

After the removal of the vulcanized bodies from the element 20ᵃ the latter is placed on the support 77 and it and the element 20ᵇ are soaped in a well-known manner and then assembled and locked together, as shown in Fig. 1.

79 indicates a conveyor extending from the support 77 to the squirting mechanism B. The conveyor preferably comprises an endless belt, running around rollers 79ª (preferably connected by a drive chain 80) one of which is driven by a suitable motor 81. As soon as the elements 20ᵃ, 20ᵇ, have been assembled and locked, the operative places the member 20 on the conveyor 79, which automatically conveys it to a table or support 82. An operative then positions the member 20 on the bed 30 for refilling. When the member is provided with a sealing valve 20ᵈ, the operative opens the same before positioning the vulcanizing member on the bed 30. 79ᵇ indicates a hood or casing which covers the conveyor 79. The sides of the hood are preferably correlated with the side edges of the conveyor belt so as to form a chamber through which the members 20 move, the object of this construction being to prevent undue cooling of the vulcanizing members 20 and hence enable the apparatus to be operated economically.

In Figs. 9, 10, 11 and 12, I have shown another form of construction suitable for carrying out my improved process of shaping and forming vulcanized bodies. Referring particularly to these views, B′ indicates as an entirety the squirting mechanism. Of this mechanism, 83 indicates a frame preferably comprising a base 84 and an upright or standard 85. The base 84 and standard 85 may be integrally formed. Along its front edge or portion, the standard 85 may be provided with an integral plate 86 arranged to form a suitable support for upper and lower supporting elements 87 and 88, respectively. On account of the relatively high pressure used in carrying out the squirting operation, the supporting elements 87, 88, are preferably connected by a pair of strut rods 87', the opposite ends of which extend through aligned openings in the elements 87, 88, and are secured thereto by nuts 87ª, in a well-known manner.

The supporting element 87 is bored, as shown at 89, and provided with an upwardly extending tubular wall 90 arranged to form a cylinder 26'. The cylinder 26' is closed at its upper end by a plate or head 91, secured in position by suitable means, such for example by a pair of clamping members 92. 26ª' indicates a piston of suitable construction mounted in the cylinder 26'. 13' indicates a rod connected to the piston 26ª' and slidable through an opening 93 formed in the supporting element 87 at the lower end and axially of the cylinder 26'. The piston 26ª' is preferably adapted to be operated upwardly and downwardly by water under pressure. For this purpose, the upper and lower ends of the cylinder 26' are formed with inlet and outlet openings, one at each end, to the walls of which are connected water pipes 94 and 95, leading to a source of supply (not shown).

96 indicates a valve mechanism of suitable construction adapted to control the flow of water to and from the upper end of the cylinder 26' or to cut off the flow thereto. The valve may be operated by a handle 97. In the preferred form of construction the pipe 95 is always connected to the source of supply, whereas the pipe 94 is connected through the valve mechanism 96, either with the source of supply through a pipe 94ª, or with a discharge pipe 94ᵇ. The valve mechanism 96 preferably comprises a valve member movable into three different positions, as indicated by the handle 97 in Fig. 11, whereby the water pressure to the upper side of the piston may be controlled in a well-known way.

98 indicates an opening formed in the supporting element 88 and arranged to receive a cylinder 15'. The cylinder 15' is preferably of a size, relative to the opening 98, to permit the provision of an annular member 16' between it and the wall of the opening 98. The annular member may be heated to any desired degree of temperature so as to maintain the material in the cylinder 15' hot or in a plastic condition, or in a suitable condition to facilitate its squirting, kneading and mixing, and shaping. The outer wall of the annular member 16' may be formed with a spiral groove 17', which cooperates with the wall of the opening 98 to form a steam conduit. The opposite ends of the conduit are connected with openings formed in the walls of the supporting element 88, and these openings in turn are connected with steam supply and discharge pipes 18', 19', respectively. The opening 98 in the supporting element 88 is preferably formed at its upper end with an annular recess 98ª in which fits a flange 16ª' provided on the upper end of the annular member 16', whereby the latter is supported in the opening 98. 22' indicates a plug or head element for closing the lower end of the cylinder 15' and formed with an opening 22ª' which registers or communicates with the opening 23ª' in a nozzle 23'. The wall of the head element above and surrounding the opening 22ª' is preferably of conical shape, as shown at 24', and so arranged that its upper end terminates at a point coinciding with the lower end of the inner surface of the cylinder 15'. To provide for the arrangement just described, I prefer to terminate the cylinder 15' above the lower end of the heating member 16' and to fit the head element 22' in the latter, but tight against the adjacent end of the cylinder 15'. The head element 22' is preferably secured in position by means of screw threads provided on it and the adjacent inner walls of the heating member 16'. These means permit the head element 22' to be readily removed, when necessary. The walls of the opening 22ª' below the conical wall 24' are suitably formed to receive the inner end of the nozzle 23', the latter being preferably secured therein by means of screw threads 23ᵇ'. The outer end of the nozzle 23' is preferably beveled so that it may be properly fitted to and correlated with the material inlet opening 20ᶜ for the cavity or cavities in the vulcanizing member 20. 99 indicates a plunger slidably mounted in the cylinder 15' and adapted to squirt the material therein through the opening 22ª' and nozzle 23'. The plunger 99 snugly fits the inner wall of the cylinder 15'. Its head end is preferably cut away at its central portion so as to provide an annular scraping edge 15ˣ, which serves to scrape the material from the cylinder wall, as the plunger operates downwardly, and to prevent the material from leaking past it.

The plunger 99 is preferably connected directly to the lower end of the piston rod 13' in any well-known manner. The plunger 99 is arranged to be moved downwardly, to force the material through the opening 22ª', by the piston 26ª' due to the pressure of the water above and to be lifted by the piston when the water pressure above it is cut off and the pipe 94 is connected with the waste pipe 94ᵇ. The plunger 99 may be elevated to a point above the cylinder 15' (see dotted lines in Fig. 12) to permit a charge of material to be placed in the latter. As shown in the drawing, the walls of the cylinder 26', the opening in the supporting element 87 for the piston rod 13', and the cylinder 15' serve as guides for the piston 26ᵃ', rod 13' and plunger 99; furthermore, since the cylinders 26' and 15' are in alignment, a relative high pressure can be exerted upon the plunger 99 in a simple manner and without the utilization of unduly heavy supporting elements and framework.

100 indicates a trough or cup fixed to the piston rod 13' and arranged to collect any water which may leak past the gland 101. The piston rod 13' is preferably reduced in diameter to form a shoulder against which the trough 100 is fixed to insure the collection of all escaping water. The trough 100 may be screw-threaded to the reduced portion of the piston rod 13'. 102 indicates a conduit connected to the trough for conveying the water therefrom.

30' indicates a bed on which the vulcanizing member 20 is positioned for the squirting operation. The bed 30' is movable up and down on guides 103, a sufficient distance to permit proper engagement of the walls of the material inlet opening 20ᶜ with the nozzle 23' (see Fig. 12) and disengagement of such walls therefrom (see Fig. 11). The bed 30' preferably comprises a relatively heavy base plate 30ᵃ', which may be slidably connected near its opposite ends to the guide 103, and a heating plate 30ᵇ formed with a plurality of connected steam conduits 30ᶜ to which are connected steam supply and discharge pipes 34', 35', respectively.

36' indicates as an entirety devices for raising and lowering the bed 30' to cause engagement of the vulcanizing member 20 with the nozzle 23' and disengagement therefrom. These devices preferably comprise an internally screw threaded socket 36ᵃ mounted on the base 84 and a screw 36ᵇ fitted therein. 36ᶜ indicates a hand wheel, fixed in any well-known manner to the screw 36ᵇ, whereby the latter may be turned. As shown, the screw 36ᵇ engages the underside of the bed plate 30ᵃ' and thus operates to raise and lower the bed 30' when it is turned in one direction or the other, as the case may be. The upper end of the screw may be provided with a head 36ᵈ, loosely fitting a socket formed between the base plate 30ᵃ' and a collar member 36ᵉ. 31' indicates a means for heating the vulcanizing members 20 after they have been charged or filled with material by the squirting mechanism B'. The heating means 31' are similar in construction to the means 32 already described, except that the chamber 32ᵃ' is open along its opposite longitudinal sides, instead of at its opposite ends. In this form of construction the filled vulcanizing members are positioned in the chamber 32ᵃ' independently and removed therefrom in like manner.

104, 105 indicate supports extending from end to end along the front or receiving side and rear or delivery side of the heating chamber 32ᵃ'. The supports 104, 105 and heating means 31' are preferably so arranged that the support 104 is in line with the bed plate 30', which arrangement permits the moving and feeding mechanism, indicated as an entirety at 56', to move the filled members 20 from the squirting position onto and along the support 104. Each of the supports 104, 105, preferably comprises a series of loosely mounted rollers which facilitate the movement of the members 20 therealong.

63' indicates the mechanism for separating the elements 20ᵃ, 20ᵇ, comprising each vulcanizing member 20, and removing the vulcanized body from the element 20ᵃ. The mechanism 63' is arranged at the delivery end of the support 105; this arrangement permits the elements 20ᵃ, 20ᵇ, to be readily assembled and positioned in front of the pusher 61' of the moving and feeding mechanism 56'. The moving and feeding mechanism 56' and the separating mechanism 63' are similar in construction and operation to the mechanisms 56 and 63, respectively, already described in connection with the construction shown in Fig. 1. Accordingly, further description thereof will not be necessary.

In Figs. 32 to 37, inclusive, I have shown a modified form of construction in which certain of the core pins 47 are made in two detachable sections 47ᵃ, 47ᵇ. 47ᶜ indicates a screw threaded extension provided on the inner end of the section 47ᵃ and arranged to screw into a socket 47ᵈ formed in the section 47ᵇ, whereby the sections may be secured together. 47ˣ' indicates an annular shoulder provided on the section 47ᵇ. 47ᵉ indicates an annular shoulder provided on the section 47ᵃ. In assembling the sections 47ᵃ, 47ᵇ, a bushing 21 is first positioned on one of the sections, then the other section is connected thereto and the two screwed together, thus clamping the bushing 21 between the shoulders 47ˣ' and 47ᵉ. The core pins are then assembled in the vulcanizing member 20, as shown in Figs. 32 and 33. This form of construction serves to maintain the bushings 21 in proper position during squirting; it also serves to close the space between the end walls of the bushings 21 so that none of the material will be forced in and around these walls and between the inner walls of the bushings and the core pins. As a result, the vulcanized bodies will be perfectly formed and all unnecessary cleaning or finishing will be eliminated.

To those skilled in the art to which my invention relates, many alterations in construction and widely differing embodiments of my invention will suggest themselves without departing from the spirit and scope thereof. My description and disclosures herein are purely illustrative and are not intended to be in any sense limiting.

The operation of the apparatus may be briefly described as follows: The squirting plunger is raised to a point above the cylinder 15. The cylinder is then filled with a quantity of the material to be used, preferably as it comes directly from the mixing mill. The sheeted material may be rolled up or folded into a chunk-like mass for convience in charging the cylinder. The cylinder, which may be of any desired size, may be substantially filled with the material and the squirting operations may be carried on until the entire charge has been used up, the heating means for the cylinder serving to maintain the material in suitable condition for squirting. Starting with a vulcanizing member 20 on the table or support 82, it is moved on to the bed 30 with the inlet opening 20$^c$ in registry with the nozzle 23. To facilitate the positioning of the members 20 at the squirting station, suitable stops or other guides may be provided on the bed 30. The bed 30 is then raised, by operating the valve mechanism 40, to connect the nozzle 23 to the material inlet 20$^c$, the pressure being maintained on the piston until the squirting operation is completed. When the vulcanizing member is provided with a valve 20$^d$, it is slid outwardly, as shown in Figs. 1, 20 and 23, prior to the elevating of the bed 30, so as to bring its opening 54 in line with the opening 20$^c$. Next, the valve mechanism 28 is operated to move the plunger 13 downwardly, which squirts the material into the cavities of the vulcanizing member 20. The pressure is maintained on the piston to which the plunger 13 is connected until the material commences to flow from or extrude itself through the grooves 48$^a$, which indicates to the operative that the cavities are filled or charged. The lever of the valve mechanism 28 is then moved to neutral position and the bed lowered to disconnect the vulcanizing member from the nozzle. The vulcanizing member is then moved rearwardly onto the table 62 in operative relation to the pusher 61. As the table 62 is preferably arranged immediately behind the squirting station, it will be seen that the operation of positioning each member 20 on the bed 30 may be utilized to move the previously squirted member, by engagement therewith, from the bed 30 onto the table 62. When a vulcanizing member 20 has been moved onto the table 62, the valve mechanism 65 is operated, whereupon the pusher 61 will move or feed the member 20 into the heating chamber 32' through which it will be moved by succeeding members 20 as they are successively squirted and engaged by the pusher 61. As each member 20 is discharged from the heating chamber 32', it is positioned on the guides 67 of the separating mechanism 63, and the clamping devices, which secure the elements 20$^a$, 20$^b$, together, are removed. The lever 73 is then moved downwardly. This operation effects a separation of the element 20$^a$ and vulcanized body A from the element 20$^b$. The element 20$^b$ is then removed from the guides 67 and placed on the support 77. Thereafter, the element 20$^a$ is positioned on the guides 67 and the lever 73 again operated downwardly, which serves to separate the vulcanized body A therefrom. The operative then removes the element 20$^a$ from the guides 67 and positions it on the support 77. The elements 20$^a$, 20$^b$, are then soaped in a well-known manner and assembled and locked or clamped together. The member 20 is then placed on the conveyor 79 and returned to the table 82 ready to be re-filled. It will be understood that I provide a series of vulcanizing members 20 and squirt them successively, so that they are charged, vulcanized, separated or opened, soaped and re-assembled in a continuous cycle.

In the form of construction shown in Figs. 9, 10, 11 and 12, the vulcanizing members 20 are positioned at the squirting station; after being charged they are pushed step by step along or endwise of the support 104 from which they are moved laterally by an operative into the heating chamber 32$^{a\prime}$ at any point where a space is provided due to the previous removal of a vulcanizing member 20 at the end of the vulcanizing operation therein from the heating chamber onto the support 105. As the material in each vulcanizing member 20 is vulcanized, the latter is removed from the chamber 32$^{a\prime}$ onto the support 105 and moved therealong to the separating mechanism 63'. After the member 20 has been opened and the vulcanized body or bodies removed from it, the two elements 20$^a$, 20$^b$, are soaped and assembled and then positioned in front of the pusher 61' by which it is moved to the charging or squirting station.

In both forms of construction the heating chambers are preferably of a size to accommodate approximately as many vulcanizing members as can be squirted in the period required to vulcanize the material in one of the vulcanizing members 20. Accordingly, by removing that member 20 which has been subjected to heat the required period of time each time a squirting operation takes place and then filling the space released thereby with the newly charged member 20, the full capacity of the heating or vulcanizing chamber can be continuously utilized.

From the foregoing description it will be seen that the vulcanized members 20 are successively moved in a cycle first to a squirting station, then to a heating or vulcanizing station, then to a station where they are opened and the vulcanized bodies removed, then to a soaping and assembling position and back to the squirting station, and that the apparatus is substantially automatic whereby a minimum number of operatives are required and the various mechanisms controlled in a simple manner to permit rapid operation and increased and uniform output at minimum cost.

My process is highly advantageous for the reasons, among others, that (1) all equipment other than that required for mixing with the rubber or rubber compound the ingredients which react to effect vulcanization, is eliminated; (2) by squirting the material directly into cavities of the member in which the rubber is to be vulcanized I eliminate practically all labor, and various operations now considered essential in the manufacture of soft and hard rubber articles; (3) in place of the present used vulcanizing presses and the expense incident to the operation thereof, I substitute a heating chamber in which the vulcanizing members are placed for the required time to effect vulcanization; and (4) as the material is squirted into cavities having the exact shape of the article to be made only that quantity of material actually required to fill the cavity is used and therefore substantially all waste of the material due to the formation of webs, fins, etc., is avoided.

From the foregoing description it will be seen that when the elements 20ª, 20ᵇ, are assembled they are locked in fixed relationship. Accordingly, the material can be squirted into the cavity or cavities thereof under a relatively high pressure. Furthermore, as this operation serves to completely fill the cavity or cavities and the walls thereof are held rigidly, bodies conforming exactly to the shape of the cavities can be made by the mere application of heat. Accordingly, I am enabled to produce vulcanized articles without the use of steam heated presses.

It will also be seen that my process and the apparatus required in carrying out the same in a practical way are relatively simple, that the apparatus is comparatively inexpensive and that a large number of articles can be made cheaply, easily and quickly.

By the improved apparatus used in carrying out my process, I am enabled to employ a series of vulcanizing members 20 and to operate the same in a cycle successively from station to station, first to charge, heat, separate them, and soap and re-assemble the elements of each thereof for recharging, so that a large output of completed articles is obtained.

By squirting the material directly into the cavities in which the material is vulcanized, (1) all preliminary operations, for example, that of calendering, sheeting, sizing, weighing, trimming, cutting and manual positioning in cavities of the sections to be pressed and vulcanized therein, are eliminated and (2) heated presses and power for operating the same are not required.

What I claim is:

1. The herein disclosed process which consists in assembling and securing together the elements of a vulcanizing member and inserting therein devices shaped to engage the vulcanized body to separate it from the cavity walls of said vulcanizing member, then in squirting a vulcanizable material through an inlet or gate into the vulcanizing member, then in subjecting said member to sufficient heat to effect vulcanization of the material, and finally moving said devices to separate the vulcanized body from the walls of said member.

2. In apparatus of the class described, the combination of supporting means over which a plurality of vulcanizing members are adapted to move, means engaging each of said members while in one position on said supporting means for squirting material into the cavity therein, a heating means, and a conveying means associated with said squirting means and said heating means whereby the vulcanizing members are moved from one to the other in one direction.

3. In apparatus of the class described, the combination of supporting means over which a vulcanizing member is adapted to move, means engaging said member while in one position on said supporting means for squirting material into its cavity, a heating means, a conveying means associated with said heating means, and mechanism at the end of said conveying means for separating the walls of the vulcanizing member.

4. In apparatus of the class described, the combination of supporting means over which a vulcanizing member is adapted to move, means engaging said member while in one position on said supporting means for squirting material into its cavity, a heating means, a conveying means associated with said heating means, mechanism at the end of said conveying means for separating the walls of the vulcanizing member, and a separate conveying means for moving the vulcanizing member toward its cavity filling position.

5. In apparatus of the class described, the combination of a support over which a vulcanizing member is adapted to move, means for squirting material into the cavity of the vulcanizing member while in one position on said support, a heating means for heating said member, and means associated with said support and arranged to support one part of said member while engaging its other part to open it.

6. In apparatus of the class described, the combination of a mechanism for squirting material into the cavity of a vulcanizing member, a heating chamber, and means for moving the charged vulcanizing number into said chamber.

7. In apparatus of the class described, the combination of a mechanism for squirting material into cavities formed in vulcanizing members, a heating chamber, and means for moving the charged vulcanizing members into and through said chamber.

8. In apparatus of the class described, the combination of a mechanism for squirting material into vulcanizing members each of which is formed with a cavity, a heating chamber, means for moving the charged vulcanizing members into and through said chamber, and means for separating the cavity walls of each said member to permit removal of the body vulcanized therein.

9. In apparatus of the class described, the combination of a mechanism for squirting material into vulcanizing members each of which is formed with a cavity, a heating chamber, means for moving the charged vulcanizing members into and through said chamber, and means for separating the cavity walls of each said member and removing the vulcanied body therefrom.

10. In apparatus of the class described, the combination of a mechanism for squirting a vulcanizing material into the cavity of a vulcanizing member, said mechanism including a table over which the vulcanizing members are moved, a heating chamber having its open end adjacent said table, and means for successively moving the members from said table into said chamber.

11. In apparatus of the class described the combination of a mechanism for squirting a vulcanizing material into a cavity formed between the separable walls of a vulcanizing member, said mechanism including a table over which the vulcanizing members are moved, a heating chamber having its receiving end adjacent said table, means for successively moving the members from said table into said chamber, and means at the discharge end of said chamber for separating the walls of said vulcanizing members to permit removal of the vulcanized body.

12. In apparatus of the class described, the combination of a mechanism for squirting a vulcanizing material into cavities formed between the separable walls of vulcanizing members, a heating chamber having its receiving end adjacent said mechanism, means for successively moving the vulcanizing members into said chamber, means at the discharge end of said chamber for separating the walls of said vulcanizing members, and a conveyor for returning the vulcanizing members to a position adjacent said squirting mechanism.

13. In apparatus of the class described, the combination of a mechanism for squirting a vulcanizing material into the cavity of a vulcanizing member, a heating chamber having its receiving end adjacent said mechanism, means for moving the member into and through said chamber, and means at the discharge end of said chamber for opening said vulcanizing member.

14. In apparatus of the class described, the combination of a mechanism for squirting a vulcanizing material into the cavity formed between separable elements of a vulcanizing member, a heating chamber having its receiving end adjacent said mechanism, means for moving the member into said chamber, means at the discharge end of said chamber for separating said elements, and a conveyor for returning the vulcanizing member to a position adjacent said squirting mechanism.

15. In apparatus of the class described, the combination of a mechanism for squirting a vulcanizing material into the cavity formed between separable elements of a vulcanizing member, a heating chamber having its receiving end adjacent said mechanism, means for successively moving the members into said chamber, means at the discharge end of said chamber for separating said separable elements, a support adjacent said separating means, adapted to receive the separated elements, and a conveyor leading from said support for returning the vulcanizing member to a position adjacent said squirting mechanism.

16. In apparatus of the class described, the combination of a mechanism for squirting a vulcanizing material into the cavities formed between separable elements of vulcanizing members, a heating chamber having its receiving end adjacent said mechanism, means for successively moving the vulcanizing members into said chamber, means at the discharge end of said chamber for separating the elements of each vulcanizing member, a conveyor for returning the vulcanizing members to a position adjacent said squirting mechanism, and a hood for said conveyor for enclosing the vulcanizing members during their movement on said conveyor.

17. In apparatus of the class described, the combination of a bed, a vulcanizing member removably engaging said bed, means for squirting rubber into the cavity of said member while on said bed, and means for heating said bed.

18. In apparatus of the class described, the combination of supporting devices including a bed, a vulcanizing member movable over said supporting devices and said bed, means engaging said member while on said bed to fill its cavity with material, means for heating said bed, and separate means having its receiving end adjacent said filling means arranged to receive said member and heat it to vulcanize the material in its cavity.

19. In apparatus of the class described, the combination of supporting devices including a bed, a vulcanizing member movable over said supporting devices and said bed, means engaging said member while on said bed to fill its cavity with material, separate means having its receiving end adjacent said filling means for receiving and heating said member to vulcanize the material in its cavity, and conveying devices associated with one of said means for moving said vulcanizing member relative thereto.

20. In apparatus of the character described, the combination of a bed arranged to be raised and lowered, a vulcanizing member formed with a cavity mounted on said bed, means for squirting material into the cavity of said member, and means for raising the bed to connect said member with the nozzle of said squirting mechanism and to lower the bed to disconnect it therefrom.

21. In apparatus of the character described, the combination of a bed, a vulcanizing member formed with a cavity arranged to be placed on said bed, means for squirting material into the cavity of said member, said squirting means including a cylinder for containing the material, means for heating said cylinder, and separate means for heating said member while it is on said bed.

22. In apparatus of the class described, the combination of a bed, a vulcanizing member arranged to be positioned on said bed, and formed with a cavity and an inlet opening leading thereto, mechanism for squirting material into and through the inlet opening of said member, and a valve for closing the inlet opening at the end of the squirting operation, said valve being formed with a seat for the nozzle of said squirting mechanism arranged to register with said inlet opening when the valve is in open position.

23. In apparatus of the character described, the combination of mechanism for squirting material, a support associated with said material squirting mechanism, a vulcanizing member comprising separable elements having recesses arranged to form a cavity when said elements are assembled, and means for locking said elements together, whereby said member after it is charged with material can be bodily moved over said support.

24. In apparatus of the class described, the combination of means for squirting material into the cavities of vulcanizing members, means spaced from said squirting means for heating said members, and a support extending from said squirting means to said heating means and arranged to permit movement of the vulcanizing members successively into position to be charged and then to said heating means.

25. In apparatus of the class described, the combination of means for squirting material into the cavities of vulcanizing members, means for heating said members, and a support extending from said squirting means to said heating means and arranged to permit movement of the vulcanizing members into position to be charged and then to said heating means, said support including a vertically movable bed and means for operating said bed to engage each said member with said squirting means and disengage it therefrom.

26. In apparatus of the class described, the combination of a support, a vulcanizing member comprising separable parts, means for locking said parts together, whereby they can be moved over said support, means for squirting material into the cavity between said parts after they are locked, and a heating means arranged to receive the charged member from said support.

27. In apparatus of the character described, the combination of mechanism for squirting material, a vulcanizing member comprising separable elements having recesses arranged to form a cavity when said members are assembled, means for locking said elements together, means for supporting said member in operative engagement with the nozzle of said squirting mechanism, means for heating said member during the squirting operation, and separate means for heating said member to cause vulcanization.

28. In apparatus of the class described, the combination with a frame formed with an opening, of a cylinder mounted in said opening and arranged to contain material and provided at one end with a head formed with a discharge opening, a plunger movable in said cylinder to force the material through said discharge opening, a support for a vulcanizing member, and means movable in a direction axially of said plunger for moving said support toward and from the head of said cylinder, whereby the vulcanizing member is connected with said discharge opening and disconnected therefrom.

29. In apparatus of the class described, the combination with a frame formed with an opening, of a cylinder mounted in said opening and arranged to contain material and provided at one end with a head formed with a discharge opening, a plunger movable in said cylinder to force the material through said discharge opening, a support for a vulcanizing member, means movable in a direction axially of said plunger for moving said support toward and from the head of said cylinder, whereby the vulcanizing member is connected with said discharge opening and disconnected therefrom, and means for heating the walls of said support.

30. In apparatus of the class described, the combination with a frame formed with an opening, of a cylinder mounted in said opening and arranged to contain material and provided at one end with a head formed with a discharge opening, a plunger movable in said cylinder to force the material through said discharge opening, a support for a vulcanizing member, means movable in a direction axially of said plunger for moving said support toward and from the head of said cylinder, whereby the vulcanizing member is connected with said discharge opening and disconnected therefrom, and means for moving a vulcanizing member into position on said support after it is moved away from said head.

31. In apparatus of the class described, the combination of a vulcanizing member formed with a cavity and inlet openings leading thereto, a cylinder for containing material to be vulcanized, a head for one end of the cylinder, said head being formed with a plurality of discharge openings, the inner walls of which are substantially conical, and a plunger for forcing the material in said cylinder through the discharge openings and the inlet openings of said vulcanizing member into the cavity of the latter.

32. In apparatus of the class described, the combination of a frame formed with an opening, a cylinder arranged to receive a charge of material, an annular member surrounding said cylinder and mounted in the opening in said frame, the outer wall of said member being formed with a helical groove co-operating with the inner wall of the opening to form a conduit having an inlet and an outlet, means for supplying a heating medium to the inlet of said conduit, a head arranged at the lower end of said cylinder and formed with a discharge opening, a plunger in said cylinder for squirting the material placed therein through the opening in said head, and means for operating said plunger.

33. In apparatus of the class described, the combination of a frame, a cylinder supported in said frame and arranged to receive a charge of material, a head for the lower end of said cylinder formed with a discharge opening, a reciprocating plunger in said cylinder for squirting the material placed therein through said opening, means for operating said plunger, and a bed mounted to move toward and from said discharge opening, a vulcanizing member arranged to be supported by said bed, and means for operating said bed to connect the inlet of said member with said opening and disconnect it therefrom.

34. In apparatus of the class described, the combination of a pair of elements formed with recesses which form a cavity when said elements are assembled face to face, one of said elements being formed with an inlet opening through which material may be squirted into said cavity, means for securing said elements together, flanges projecting from the opposite longitudinal edges of one of said elements, whereby it may be held against movement while the other element is being separated therefrom.

35. In apparatus of the class described, the combination of a pair of elements formed with recesses which form a cavity when said elements are assembled face to face, one of said elements being formed with an inlet opening through which material may be squirted into said cavity, means for securing said elements together, flanges projecting from the opposite longitudinal edges of said elements, whereby one of said elements may be held against movement while the other element is being separated therefrom and the last said element held against movement while the vulcanized body is being removed from it.

36. In apparatus of the class described, the combination of a pair of elements formed with aligned openings and recesses which form a cavity for a vulcanizable material when said elements are assembled face to face, and devices slidably mounted at their opposite ends in said aligned openings constructed and arranged to act on the walls of said material to separate said elements when said devices are moved endwise.

37. In apparatus of the class described, the combination of a pair of elements formed with aligned openings and recesses which form a cavity when said elements are assembled face to face, and devices slidably mounted at their opposite ends in said aligned openings and provided with shoulders arranged to act on the wall of one of said elements to separate the same when said devices are moved endwise.

38. In apparatus of the class described, the combination of a pair of elements formed with aligned openings and recesses which form a cavity when said elements are assembled face to face, and devices slidably mounted at their opposite ends in said aligned openings and provided with shoulders arranged to act on the walls of said material to separate said elements when said devices are moved endwise.

39. In apparatus of the class described, the combination of a pair of elements formed with recesses which form between said elements when they are assembled face to face a cavity for a vulcanizable material, one of said elements being formed with an inlet opening through which the material may be squirted into said cavity, means for securing said elements together, and devices serving as core pins mounted at their opposite ends in aligned openings formed in said elements, each said device comprising a pair of members arranged to hold between them a bushing to be embedded in the vulcanized material.

40. In apparatus of the class described, the combination of a pair of elements formed with recesses which form between said elements when they are assembled face to face a cavity for a vulcanizable material, one of said elements being formed with an inlet opening through which the material may be squirted into said cavity, means for securing said elements together, devices serving as core pins mounted at their opposite ends in aligned openings formed in said elements, each said device comprising a pair of members arranged to hold between them a bushing to be embedded in the vulcanized material, and means for securing each said pair of members together.

41. A vulcanizing member comprising a pair of elements having opposing recesses which form a cavity when said elements are assembled face to face, one of said elements being formed with an inlet opening through which material may be squirted into said cavity, and the abutting face of one of said elements being formed with a groove leading from the adjacent recess to the free edge of the element.

42. In apparatus of the class described, the combination of mechanism for squirting material into the cavity of a vulcanizing member, a heating chamber open along one longitudinal side thereof, and a support extending from said squirting mechanism to and along the open side of said heating chamber.

43. In apparatus of the class described, the combination of mechanism for squirting material into the cavity of a vulcanizing member, a heating chamber open along its opposite longitudinal sides, a support extending from said squirting mechanism to and along one longitudinal open side of said chamber, and another support extending along the other longitudinal open side of said chamber.

44. In apparatus of the class described, the combination of mechanism for squirting material into the cavity of a vulcanizing member, a heating chamber open along one longitudinal side thereof, a support extending from said squirting mechanism to and along the open side of said heating chamber, and means for moving vulcanizing members successively to said squirting mechanism and then to and along said support.

45. In apparatus of the class described, the combination of mechanism for squirting material into the cavity of a vulcanizing member, a heating chamber open along its opposite longitudinal sides, and supports extending along and adjacent the open sides of said chamber, means for feeding the vulcanizing member along one of said supports relative to said chamber.

46. In apparatus of the class described, the combination of mechanism for squirting material into the cavity of a vulcanizing member, a heating chamber open along its opposite longitudinal sides, a support extending from said squirting mechanism to and along one longitudinal open side of said chamber, another support extending along the other longitudinal open side of said chamber, and means for opening said vulcanizing member.

47. In apparatus of the class described, the combination of mechanism for squirting material into the cavity of a vulcanizing member, a heating chamber open along its opposite longitudinal sides, a support extending from said squirting mechanism to and along one open side of said heating chamber, a support extending along the other open side of said chamber, and means arranged at that end of said last mentioned support adjacent to said squirting mechanism for opening said vulcanizing member.

48. In apparatus of the class described, the combination of mechanism for squirting material into the cavity formed between the separable elements of a vulcanizing member, a heating chamber open along its opposite longitudinal sides, a support extending along and adjacent one open side of said chamber, means for feeding the vulcanizing member along one of said supports relative to said chamber, a separate support extending along and adjacent the other open side of said chamber, mechanism at that end of the last mentioned support adjacent said squirting mechanism for separating the elements of said vulcanizing member, and a support extending from said separating mechanism to said squirting mechanism.

49. In apparatus of the class described, the combination of a pair of spaced supports arranged to support a vulcanizing member, a reciprocating member carrying a plurality of ejectors adapted to engage movable elements carried by the vulcanizing member to separate the lower element thereof from the upper element, and means for operating said member.

In testimony whereof I affix my signature.

STANLEY T. CAMPBELL.